3,503,769
METHOD OF MODIFYING ALKYLENE GLYCOL ALGINATES
Richard Henry McDowell, London, England, assignor to Alginate Industries Limited, London, England, a British company
No Drawing. Filed Aug. 31, 1967, Ser. No. 664,627
Claims priority, application Great Britain, Sept. 8, 1966, 40,235/66
Int. Cl. C08b 25/00
U.S. Cl. 106—208          5 Claims

ABSTRACT OF THE DISCLOSURE

The invention is a method of modifying aqueous solutions of alkylene glycol alginates such as propylene glycol alginate by a mild alkali treatment. Under controlled conditions of treatment the viscosity of the solution can be increased and in some instances visco-elastic solutions or even gels are produced. The alkylene glycol alginate may be used alone or in admixture with other polymeric materials such as starch and polyvinyl alcohol. The modified solutions are useful for the production of suspensions such as fruit squashes and as binding or coating agents such as in the production of fish foods and the coating of paper respectively.

---

This invention relates to a method of modifying alkylene glycol alginates, and in particular to a method of modifying the properties of alkylene glycol alginates to improve their effectiveness as suspending agents and binding or coating agents.

Alginic acid is a polyuronic acid and reaction with alkylene oxides leads to the formation of alkylene glycol esters of alginic acid i.e. alkylene glycol alginates. The products of this class which are most generally available are propylene glycol alginates, and these are usually propylene glycol esters of alginic acid in which from 60 to 90% of the carboxyl groups have been esterified with propylene glycol, the remaining groups being either free or neutralised with a base. Unlike the salts of alginic acid, the alkylene glycol alginates are not precipitated from solution by acidifying to a pH of from 2 to 3. Propylene glycol alginate is recognised as being a harmless food additive and is used as a thickening, suspending and stabilising agent in acidic foodstuffs.

An important use of propylene glycol alginate is the suspension of insoluble solids in fruit drinks and an object of this invention is the improvement of the suspending effect of propylene glycol alginate in such products.

In using propylene glycol alginate in solution it has generally been thought advisable to avoid making the solution alkaline as this may lead to saponification of the ester groups and also to a reduction in viscosity.

We have now found surprisingly that under some conditions it is possible to modify certain alkylene glycol alginates by a mild alkali treatment which leads to the production of a material having a higher viscosity and improved properties e.g. improved properties as a suspending agent.

Accordingly, the present invention provides a method of modifying an aqueous solution of an alkylene glycol alginate such as propylene glycol alginate, which method comprises bringing an improvable aqueous solution containing an alkylene glycol alginate as hereinafter defined to an alkaline condition, the concentration of the solution, the amount of alkali used, and the time and temperature of the alkali treatment being selected such that in the course of the treatment the viscosity of the solution as indicated by an RVF Brookfield viscometer used at 2 r.p.m. increases to at least twice its initial viscosity. Preferably the viscosity of the solution increases to at least ten times its initial viscosity.

By the term "an improvable aqueous solution containing an alkylene glycol alginate" as used herein and in the claims we mean an aqueous solution containing an alkylene glycol alginate either alone or in admixture with one or more other polymeric substances having free hydroxyl groups which shows the stated increase in viscosity when tested in the following manner:

The alkylene glycol alginate together with any of the other polymeric substance to be used is dissolved in water at 18° C.±2° C. at such a concentration that the viscosity of the solution is between 200 and 300 poises, measured with a Brookfield RVF Viscometer at 2 r.p.m. 0.5 ml. of 2 M sodium carbonate solution for every gram of dry alkyene glycol alginate in the solution is then added slowly with good stirring, the addition taking 3 min. The mixture is kept at 18° C.±2° C. for 15 min. and 1.0 ml. of 1 M acetic acid for every gram of alkylene glycol alginate in solution is then mixed in. The viscosity is measured in the same way as before and should be at least about 500 poises.

Some less highly esterified alkylene glycol alginates, which may be improvable as defined above, are affected by the presence of calcium which may lead to an increase in viscosity. It is to be understood, therefore, that if calcium is present in the solution, equivalent to more than 0.2% of the weight of the alkylene glycol alginate, sufficient sequestering agent, such as EDTA should be added to sequester the calcium and the amount of sodium carbonate adjusted to neutralise any acidity from the sequestering agent.

Alkylene glycol esters of alginic acid having a wide range of esterification are found to be improvable but it appears that a minimum degree of esterification of about 50% is usually necessary.

Alkylene glycol esters of alginic acid with various degrees of polymerisation as indicated by their viscosity in solution may be used, but the concentration necessary to achieve the modification reaction varies with the degree of polymerisation. When alkylene glycol alginates alone are treated, it appears that the viscosity of the solution rather than its concentration determines whether the modification takes place under the action of the alkali and alginates with a low degree of polymerisation have to be used at a higher concentration than the more highly polymerised products. In general the alkylene glycol alginates will be used at a concentration of from 0.5% to 20% by weight.

The preferred alkylene glycol alginates are propylene glycol alginates.

As mentioned above the improvable solution may contain alkylene glycol alginate alone or alkylene glycol alginate and one or more other polymeric substances having free hydroxyl groups. Examples of such substances are sodium alginate, starch, carboxymethyl cellulose, methyl cellulose, guar gum and polyvinyl alcohol.

These polymeric substances may be used in addition to the alkylene glycol alginate to obtain a greater increase in viscosity than the increase obtained when using the alkylene glycol alginate alone, or they may be used to replace part of the alkylene glycol alginate to obtain a comparable increase in viscosity to that obtained when using the alkylene glycol alginate alone. Such a replacement can lead to a reduction in cost.

Starches of various types and polyvinyl alcohol are particularly effective in giving high viscosity products using a minor proportion of alkylene glycol alginate e.g. propylene glycol alginate. For example, a solution containing 1% by weight of propylene glycol alginate and 12% by weight of "thin boiling" starch had a viscosity of 2.6 poises before reaction and 1,800 poises after alkali treatment.

Sodium carbonate is particularly effective for use in rendering the alginate solution alkaline in accordance with the method of the invention, and the quantity required will generally be from 3% to 15% by weight, e.g. 3% to 10% by weight, on the weight of the alkylene glycol alginate. The alkali is dissolved in water before adding to the solution of alkylene glycol alginate, and the addition must be carried out with good mixing to avoid a local high concentration of alkali. Owing to the high viscosity of the mixture it is difficult to make rapid measurements of the pH of the mixture, but experiments indicate that the alkylene glycol alginate should not be subjected to pH values in excess of about 10 if degradation is to be avoided. For this reason the use of caustic soda is not advisable unless exceptionally efficient mixing equipment is available.

When the action of the alkali has produced an increase in viscosity the mixture is preferably reacidified to a pH of from 2 to 6. This may be done by mixing an acid into the concentrated solution of modified alginate or if the modified alginate is required in the form of a dilute solution acidification and dilution can be done at the same time.

The effect of the alkali is dependent on the temperature as well as on the viscosity of the alkylene glycol alginate solution. In general the lower the temperature during the reaction, the greater is the increase in viscosity. No viscosity increases have been observed with a reaction temperature of 40° C. or above.

Although a reduction in temperature and increase in concentration appears, as a general rule, to allow the possibility of a greater increase in viscosity in the concentrated solution, it does not necessarily lead to the best results in the solution after dilution, as concentrated solutions which have built up the greatest viscosity and elasticity are not readily diluted with water and give a mixture of discrete gel particles and water rather than a uniform solution. The highest viscosity in the diluted solution may therefore be obtained by carrying out reaction at a higher temperature than would give the maximum viscosity in the concentrated state. Although a temperature of between the freezing point of the solution and 5° C. will give the stiffest mixture after alkali treatment, it is preferred to use a temperature of from 5° C. to 25° C. to give a diluted solution with the highest viscosity.

As mentioned above, the method of the invention provides products which are useful as suspending agents. The invention, therefore, includes a suspension of insoluble material in a modified aqueous solution of an alkylene glycol alginate produced by the method of the invention. In particular the invention includes a fruit squash comprising finely divided particles of a fruit suspended in a non-toxic modified aqueous solution of propylene glycol alginate prepared by the method of the invention which has subsequently been brought to a pH of from 2 to 6. If desired sugar or other additives may be included in the fruit squash.

Also as mentioned above the method of the invention provides products which are useful as binding or coating agents.

In many applications of binding agents and adhesives it is a requirement that the bond formed between the bonded elements should be resistant to water even though the binding agent is preferably applied in the form of an aqueous solution.

In addition it is frequently necessary for an adhesive to maintain a firm bond when exposed to water, but it may be undesirable for the adhesive film to present a layer completely impermeable to moisture.

For example, it is sometimes required that powdered materials should be bonded to form granules or pellets which do not disintegrate when kept in water for several hours but which at the same time are sufficiently water absorbent to become soft under such conditions. A particular instance is to be found in fish foods which must be prepared in granules of a suitable size for the fish concerned, which must be sufficiently resistant to water if a large proportion of food is not to be lost by dispersion in the water, and yet which must be acceptable to the fish.

Further, in many treatments of various products, for example, paper products and the like it is desired to apply to the product a surface coating which is not removed by the action of water. For example, when surface sizes or coatings are applied to paper to be printed by lithographic techniques in which part of the paper surface comes into contact with moist surfaces; it is undesirable that there should be any pick up of coating or sizing materials onto the wet surface, and therefore very desirable that the coating should not be removed by the action of water.

The products of the method of the invention are particularly useful in that when used as binding or coating agents they provide bonds or coatings which are substantially water-resistant.

Accordingly the invention further includes a method of binding together discrete particles, which method comprises mixing the particles with an improvable aqueous solution containing an alkylene glycol alginate as hereinbefore defined modified by alkaline treatment and reacidification, as described herein, and thereafter drying the mixture. This method may be used, for example, to produce fish foods.

The invention still further includes a method of producing a substrate having a surface coated with a water-insoluble coating, which method comprises applying to the surface an improvable solution of an alkylene glycol alginate as hereinbefore defined, bringing the solution to an alkaline condition by treatment with alkali as described herein, neutralizing if necessary, and drying the thus formed coating.

Since one of the features of the action of an alkali on aqueous solutions of alkylene glycol alginates either in the absence or the presence of other polymeric substances having free hydroxyl groups is that as the concentration of alginate in solution is increased the extent to which insolubilisation takes place becomes more pronounced, when a coating derived from a concentrated solution is made alkaline, the amount of alkali necessary to bring about the insolubilisation may be so small that the alkali is completely neutralized by carboxyl groups liberated in saponification of part of the ester. Therefore, the step of neutralisation may be unnecessary.

If desired the coating may be acidified e.g. brought to pH of from 2 to 6, after the alkaline treatment.

Also if desired the aqueous solution containing alginate may be dried after application to the surface to be coated and before treatment with alkali.

In addition to the above uses, elastic jellies produced by the method of the invention e.g. using a mixture of alkylene glycol alginate and polyvinyl alcohol may be used for the central core of golf balls.

It will also be clear to the skilled man that there are other uses for solutions which give insoluble films on drying. Examples are to be found in the field of cosmetics and anti-misting preparations for glass.

Following is a description by way of example to further illustrate methods in accordance with the invention.

EXAMPLE 1

A propylene glycol alginate of 91% total dry matter content, 73.5% of the dry matter being esterified alginic acid, was dissolved in water to the concentrations at 20° C. given in Table 1 below. The solutions were treated with alkali, as indicated in Table 1, and after 15 mins. were reacidified with acetic acid. Parts of the solutions were diluted to 0.5% (on the net weight of the original product). Viscosities were measured on the concentrated solution with a Brookfield RVF viscometer at 2 r.p.m. and on the 0.5% solution with a Brookfield LVT viscometer at 12 r.p.m. The results were as follows:

TABLE 1

| Concentration, gm. per 100 gm. | Alkali added, ml. MNa₂CO₃ per 100 gm. sol. | Visc. of Conc. solution (poises) | Visc. of 0.5% sol. (centipoises) |
|---|---|---|---|
| 4.5 | None | 75 | 7 |
| 4.5 | 2.25 | 65 | 11 |
| 5.5 | None | 200 | 7 |
| 5.5 | 2.75 | 3,600 | 50 |

It can be seen from Table 1 above that with a low viscosity type propylene glycol alginate, there is a satisfactory increase in viscosity at a concentration of 5.5 gm. of alginate per 100 gm. water.

EXAMPLE 2

A propylene glycol aginate of 91% total dry matter content, 90% of the dry matter being esterified alginic acid, was dissolved in water to the concentration at 20° C. given in Table 2 below. The solutions were then treated as in Example 1 with the following results:

TABLE 2

| Concentration, gm. per 100 gm. | Alkali added, ml. MNa₂CO₃ per 100 gm. sol. | Visc. of Conc. solution (poises) | Visc. of 0.5% sol. (centipoises) |
|---|---|---|---|
| 2.0 | Nil | 24 | 16.5 |
| 2.0 | 1.0 | 2.5 | 12 |
| 3.0 | Nil | 269 | 16.5 |
| 3.0 | 1.5 | 1,325 | 495 |
| 4.0 | Nil | 1,023 | 16.5 |
| 4.0 | 2.0 | 4,900 | 495 |

It will be seen from the results that with a propylene glycol alginate, which has a higher viscosity for the same concentration than the alginate used in Example 1, the alginate can be reacted satisfactorily at a lower concentration.

EXAMPLE 3

The propylene glycol alginate used was the same as that in Example 1. In each case a 5.5% solution was used and the reaction was carried out at different temperatures, the reaction conditions being otherwise the same as in Example 1. The viscosities of the reaction solutions were measured at the temperature of reaction and those of the 0.5% solution at 20° C. The unreacted 0.5% solution had a viscosity of 7 c.p.s. The effects of the temperature on the reaction is shown by the results given in Table 3 below:

TABLE 3

| Temperature, °C. | Viscosity of reaction solution (poises) | | Viscosity of reacted solution diluted to 0.5% (centipoises at 20°C.) |
|---|---|---|---|
| | Before reaction | After reaction | |
| 10 | 310 | 14,000 | 248 |
| 20 | 200 | 3,600 | 50 |
| 40 | 140 | 28 | 8.5 |

EXAMPLE 4

The propylene glycol alginate was the same as in Example 2. A 2% solution was reacted at 10° C. and in Table 4 below the results are compared with those obtained at 20° C. as in Example 2.

TABLE 4

| Temperature, °C | Viscosity of reaction solution (poises) | | Viscosity of reacted solution diluted to 0.5% (centipoises at 20° C.) |
|---|---|---|---|
| | Before reaction | After reaction | |
| 10 | 67.5 | 1,500 | 270 |
| 20 | 24 | 2.5 | 12 |

As can be seen from the results given in Tables 3 and 4, the lower temperature of 10° C. gave a reaction which was more satisfactory from the point of view of both the increase in viscosity of the reaction mixture and of the 0.5% solution.

EXAMPLE 5

The propylene glycol alginate used was the same as that in Example 1. Two series of tests were made, both using 5.5% concentrations at 20° C. Samples were acidified and tested after different times of treatment. The viscosities of the untreated solutions were as in Example 1, i.e. 200 poises for the 5.5% solution and 7 centipoises for the 0.5% solution. In Series $a$ there were used 3.75 ml. M Na₂CO₃ per 100 g. solution, and in Series $b$ there were used 2 ml. M Na₂CO₃ per 100 g. solution. The effects of varying the amount of alkali used and the reaction time are given in Table 5 below.

TABLE 5

| Time of reaction | 5 min. | 0.5% | 15 min. | 0.5% | 1 hour. | 0.5% | 4 hours. | 0.5% |
|---|---|---|---|---|---|---|---|---|
| Concentration | 5.5% | Centi- | 5.5% | Centi- | 5.5% | Centi- | 5.5% | Centi- |
| Viscosity | Poises | poises | Poises | poises | Poises | poises | Poises | poise |
| Series a | 6,000 | 176 | 6,000 | 100 | 1,300 | 17 | 300 | |
| Series b | 1,000 | 15 | 5,200 | 34.5 | 1,700 | 17 | 320 | 12.5 |

It will be seen from these results that although the smaller amount of alkali gave a lower maximum viscosity than the larger quantity, and took longer to develop it, the loss in viscosity on standing in the alkaline condition was not so great.

EXAMPLE 6

Use of improved propylene glycol alginate to suspend the solids in fruit squash 12 gm. of the propylene glycol alginate used in Example 2 were dissolved in 388 gm. water at 15° C. and 6 ml. M Na₂CO₃ were mixed in with good stirring. After 10 min., the stiff reaction product was mixed with 2 litres of water containing 12 ml. M acetic acid, giving a smooth solution which had definite signs of structure when gently stirred. 1,540 ml. of this solution was mixed with a solution of 1170 gm. cane sugar in 2330 ml. water, and then 520 gm. comminuted whole oranges and 43 gm. citric acid were added. Before bottling the product was pasteurised by heating and rapidly cooling. The concentration of the improved propylene glycol alginate in the finished squash was approximately 0.14%.

The orange squash prepared in this way showed no sign of separation of pulp after storage for one month, while in a similar batch in which the untreated propylene glycol alginate was used the greater part of the pulp was in the bottom third of the bottle after this time. In a control batch in which no propylene glycol alginate was present, the pulp had settled to a compact mass at the bottom of the bottle.

EXAMPLE 7

A low viscosity propylene glycol alginate of 79% total dry matter, 82% of the dry matter being esterified alginic acid, was dissolved in water at 20° C. with the polymeric additives given in Table 6 below. In all cases the concentration of propylene glycol alginate was 3 grams per 100 g. of solution.

0.5 ml. M sodium carbonate solution for every gram of propylene glycol alginate was then stirred into the solution, and after 15 mins. it was reacidified with an equivalent amount of acetic acid. The viscosities before and after treatment are given in Table 6. The effect of using the propylene glycol alginate at 4% is included for comparison.

TABLE 6

| Propylene glycol alginate g./100 g. | Additive | | Viscosity (poises) | |
| --- | --- | --- | --- | --- |
| | Name | Concn., g./100 g. | Before treatment | After treatment |
| 3 | None | | 15 | 7.2 |
| 4 | do | | 75 | 450 |
| 3 | Sodium alginate (high visc.). | 1.0 | 210 | 1,850 |
| 3 | Sodium alginate (low visc.). | 1.0 | 48 | 1,000 |
| 3 | Carboxymethyl cellulose. | 0.75 | 140 | 2,000 |
| 3 | Methyl cellulose | 0.75 | 87.5 | 242 |
| 3 | Guar gum | 1.0 | 97 | 426 |

EXAMPLE 8

Another sample of propylene glycol alginate of similar composition to that used in Example 7 was tested with and without addition of a low viscosity polyvinyl alcohol. In both cases the solution contained 3 g. of propylene glycol alginate per 100 g. of solution. Viscosities were measured before and after treatment with 0.5 ml. M sodium carbonate per gram of propylene glycol alginate and reacidification, as in Example 7. Results are given in Table 7 below.

TABLE 7

| G. polyvinyl alcohol/100 g. solution | Viscosity (poises) | |
| --- | --- | --- |
| | Before treatment | After treatment |
| None | 11.2 | 7.7 |
| 1 | 13.0 | 100 |

EXAMPLE 9

The same batch of propylene glycol alginate as used in Example 7 was used to find whether, in the presence of sufficient of another polymer, a marked increase in viscosity could be obtained with a lower concentration of propylene glycol alginate. In all cases the solution contained 1 g. of propylene glycol alginate per 100 g. of solution. The amount of M sodium carbonate solution added was 1 ml. per gram of propylene glycol alginate and the solution was reacidified after standing in the alkaline condition for 15 mins. at 20° C. Viscosities before and after treatment are given in Table 8 below.

TABLE 8

| Additive | | Viscosity (poises) | |
| --- | --- | --- | --- |
| Name | G./100 gms. | Before treatment | After treatment |
| None | | 0.30 | 0.09 |
| Low viscosity sodium alginate | 8 | 10 | 8 |
| | 10 | 24 | 18.5 |
| Low viscosity polyvinyl alcohol | 8 | 2.1 | 2,000 |
| Oxidized starch | 12 | 1.2 | Stiff gel |

Comparing these results with those given in Tables 6 and 7 it will be seen that although sodium alginate could be used to take the place of some of the proylene glycol alginate when the latter was present at a concentration of 3 g. per 100 g. it was not effective in the conditions of the test when the propylene glycol alginate concentration was only 1 g. per 100 g. On the other hand a sufficiently high concentration of polyvinyl alcohol or oxidised starch was very effective with only 1 g. of propylene glycol alginate per 100 gms. of solution, even though the initial viscosity of the solutions were very low compared with those found necessary to give a viscosity increase on treatment when propylene glycol alginate was the only polymeric material present.

It should be noted that treatment of solution of the starch and polyvinyl alcohol alone by the methods described brought about no increase in viscosity, the viscosity of solution containing 8 g. of polyvinyl alcohol and 12 g. of oxidised starch per 100 g. of solution being 0.2 poise and 0.1 poise respectively before and after treatment.

EXAMPLE 10

A solution containing 1% by weight of propylene glycol alginate and 8% by weight of polyvinyl alcohol (Evanol 51–05) was coated on to a glass plate and the film dried. It was then immersed in a solution of sodium carbonate for two minutes, quickly washed and then treated with a dilute acetic acid solution and washed again. The resulting film was insoluble in water unlike the untreated film which dissolved rapidly.

EXAMPLE 11

10 g. of low viscosity propylene glycol alginate and 80 g. of polyvinyl alcohol (low viscosity type, 88 to 89% hydrolysed) were dissolved in water to give 1 kg. of solution. The solution had a viscosity of 2.1 poise and could be used in surface coating machinery. The solution was applied to paper in an amount of 500 g. of solution (containing 40 g. of solids) per square metre and dried. In this state the film could be washed off with water.

The paper was then immersed in a solution of 0.01 M sodium carbonate for 10 minutes and then in a 0.02 M acetic acid solution for 2 minutes, washed and dried. The thus formed film coating was not removed by immersion in water and in addition the paper had good grease resistant properties.

EXAMPLE 12

30 g. of propylene glycol alginate of 80% total dry matter content, 75% of the dry matter being esterified alginic acid, were dissolved in 400 ml. water at a temperature of 20° C. This solution had a viscosity of 5900 c.p.s., 12 ml. of 1 M sodium carbonate solution were added to the solution of alginate and within 15 minutes the solution had changed in consistency to that of a semi-gel. The solution was then diluted with an equal volume of water. 1 part by weight of this solution was mixed with 5 parts by weight of a mixture of ingredients for a fish having the composition:

| | Percent |
| --- | --- |
| Extracted soya meal | 17 |
| Gras meal (dried) | 8 |
| Fish meal | 25 |
| Dried milk | 10 |
| Ground wheat | 40 |

50 of this material pased a 44 mesh B.S.S. sieve and only 20% remained on an 18 mesh B.S.S. sieve.

The mixture was stirred mechanically and formed into granules which were then dried in a current of air at 60° C.

The dried granules had the following sieving analysis:

| | Percent |
| --- | --- |
| On 8 mesh BSS | 7 |
| Through 8 mesh BBB; on 18 mesh BSS | 85 |
| Through 18 mesh BSS; on 44 mesh BSS | 7 |
| Through 44 mesh BSS | 1 |

When added to water at 30° C. the granules remained intact for a period of 24 hours, thus providing an excellent fish food. Similar granules prepared with water soluble gums disintegrated within half an hour.

EXAMPLE 13

10 g. of proplyene glycol alginate (low viscosity type) were dissolved in 190 g. of cold water. 200 g. of oxidised starch were mixed with 500 g. of water and the water was boiled to bring the starch into solution. The solution was cooled and the weight readjusted to 700 g. and then mixed with the propylene glycol alginate solution. 100 g. of sucrose were dissolved in this mixture and 10 ml. of 1 M sodium carbonate were added with good stirring. At this stage the temperature of the mixture was 20° C., its viscosity 5 poises and the pH 9.0. After 15 minutes the viscosity was 25 poises and after 16 hours the pH was 7.4 and a gel had been formed. The gel was found to be effective as an adhesive for paper giving a bond more resistant to water than one of starch alone.

In addition to the above we have found that certain water-soluble organic hydroxy compounds of comparatively low molecular weight can effect and usually lower the degree of modification obtained when an improvable solution containing an alkylene glycol alginate alone or in admixture with one or more other polymeric substances containing free hydroxyl groups is modified.

The way in which the modification of the solution is affected depends on the concentration and composition of the added low molecular weight compound as is illustrated below by the results given in Table 9. A few compounds of this type augment the increase in viscosity or degree of modification of the solution, but in most cases the expected increase in viscosity is not obtained or there is even a decrease in viscosity in a solution which shows an increase in viscosity in the absence of the added low molecular weight compound. Methanol, ethylene glycol, 1:2 propylene glycol, glycerol, pentaerythritol, dextrose and sucrose are among substances which are particularly effective in lowering the viscosity. Other substances such as ethanol, n-propanol, cyclohexanol, phenol and inositol have the effect of reducing the increase in viscosity, but their effect is not significant compared with the compartaively large effects produced by the other compounds mentioned above.

On the other hand isopropyl alcohol unlike n-propanol augments the increase in viscosity, although the effect is not of the same order of magnitude as that of the polymeric hydroxy compounds mentioned above. In the same way n-butane-2-ol augments the viscosity increase while n-butane-1-ol gives a slight reduction in viscosity.

It is realised that the addition of high proportions of water-soluble organic hydroxy compounds of low molecular weight may bring about precipitation from aqueous solutions of polymers such as alginates and their derivatives and that the addition of smaller quantities may modify the flow properties of the solutions. This will be seen in the comparatively small variations in the starting viscosity of solutions containing these additives which are given in Table 9 below. The effect of many of the low molecular weight compounds which modify to only a small extent the change in viscosity due to the reaction can be attributed to this cause but the striking effect of some compounds, for example, methanol and pentaerythritol may be due to some specific chemical action.

To illustrate the effect of the low molecular weight compound solutions containing 4% of the propylene glycol alginate as used in Example 7, were prepared with the inclusion of the low molecular weight compounds listed in Table 9 below. The solutions were treated at a temperature of 20° C. with 0.5 ml. of N-sodium carbonate solution for every gram of propylene glycol alginate and after 15 minutes the solution was reacidified with an equivalent amount of acetic acid. The viscosities before and after treatment are given in Table 9.

TABLE 9

| Additive | | Viscosity (poises) | |
|---|---|---|---|
| Name | Concn. (g./100 g.) | Before treatment | After treatment |
| None | | 75 | 450 |
| Methanol | 1 | 70 | 175 |
| Do | 4 | 85.6 | 12.5 |
| Do | 8 | 100 | 5.0 |
| Ethanol | 8 | 85 | 310 |
| n-Propanol | 8 | 75 | 250 |
| Isopropanol | 8 | 80 | 1,200 |
| n-Butane-1-ol | 8 | 80 | 460 |
| n-Butane-2-ol | 8 | 120 | 1,000 |
| Ethylene glycol | 8 | 70 | 15 |
| 1:2 propylene glycol | 8 | 95 | 12.4 |
| Diethylene glycol | 8 | 70 | 60 |
| Dipropylene glycol | 8 | 80 | 700 |
| n-Butane 1:3 diol | 8 | 75 | 200 |
| n-Butane 2:3 diol | 8 | 67.5 | 800 |
| n-Butane 1:4 diol | 8 | 62.5 | 80 |
| Pentaerithrytol | 8 | 30 | 10 |
| Dextrose | 8 | 70 | 32 |
| Sucrose | 8 | 70 | 40 |
| Glycerol | 8 | 54 | 24 |
| Sorbitol | 8 | 50 | 20 |
| Raffinose | 8 | 65 | 26.5 |
| Rhamnose | 8 | 53 | 53 |

It will be noted that the effect of isopropanol and n-butane-2-ol is to increase the viscosity, but it is thought that this effect does not come from a chemical reaction but rather from an alteration in the effective concentration of the propylene glycol alginate in water. One reason for reaching this conclusion is that at concentrations of propylene glycol alginate where no viscosity increase takes place without added substances no viscosity increase on treatment takes place with up to 20% of isopropanol whereas a very marked increase takes place in the presence of relative small amounts of the polymeric substances having free hydroxyl groups.

It will be appreciated by the skilled man that in practicing the method of the invention care must be taken to exclude low melecular weight compounds of the type mentioned above unless it is desired for any particular purpose to control the viscosity of the product e.g. to keep the viscosity below a certain high maximum value. In such cases the use of a compound such as methanol provides a useful means of controlling the increase in viscosity.

It is also to be understood that the changes in viscosity mentioned in this specification do not give a full description of the changes brought about by the reaction with alkali. Another characteristic of the reacted solutions is their elasticity. This, however, cannot be expressed quantitatively without the use of elaborate measuring equipment, and the viscosity measurements are given as a simple indication of the degree to which the alkali treatment has modified the alkylene glycol alginate.

The changes that take place during the method of the invention will suggest to those familiar with polymeric materials that a cross-linking reaction is taking place. In some cases the product of reaction is a gel with a measurable rigidity and in intermediate cases visco-elastic solutions are formed. As mentioned above in some applications where the solution is to be diluted the reaction should not be taken so far that it is not easily mixed with water, but in other applications it may be preferred to take the process further. In further cases the reaction can go so far that the product loses to some extent its power of retaining water in the network so that a paste rather than a gel is formed. This has been observed particularly in solutions containing startch. If, therefore, it is desired to work with a solution of particularly high solids content it may be necessary to modify the reaction to some extent. This can be done by raising the temperature, but it may be more satisfactory to do so by the inclusion of a low molecular weight organic compound of the type mentioned above. Sucrose has been found effective for giving a gel structure in a propylene glycol alginate/starch mixture which would otherwise give a paste. It will be realised, therefore, that taking into account the different polymeric substances which may be included with the alklene glycol alginate in the aqueous solutions a very wide range of viscous and elastic properties may be obtained.

I claim:

1. A method of modifying an aqueous solution of a propylene glycol alginate to improve its suspending properties, which method comprises bringing an improvable aqueous solution containing from 0.5% to 20% by weight of a propylene glycol alginate to an alkaline condition under such conditions that the viscosity of the solution as indicated by an RVF Brookfield viscometer used at 2 r.p.m. increases to at least twice its initial viscosity, said improvable aqueous solution being selected from the group consisting of equeous solutions containing a propylene glycol alginate as the sole polymeric constituent and aqueous solutions containing a propylene glycol alginate and at least one other polymeric substance having free hydroxyl groups selected from the group consisting of sodium alginate, starch, carboxymethyl cellulose, methyl cellulose, guar gum and polyvinyl alcohol, in which the concentration can be adjusted to give a viscosity between 200 and 300 poises, and in which viscosity can be increased to at least 500 poises by a treatment comprising the steps of:

(a) slowly adding to the solution with stirring over a period of about 3 minutes 0.5 ml. of 1 M aqueous sodium carbonate solution per gram of propylene glycol alkinate in the improvable solution, (b) keeping the mixture at 18° C. ±2° C. for 15 minutes, and (c) adding to the solution 1.0 ml. 1 M acetic acid per gram of propylene glycol alginate in the improvable solution, the viscosity being measured with a Brookfield RVF viscometer at 2 r.p.m. and at a temperature of 18° C. ±2° C.

2. A method as claimed in claim 1, wherein the aqueous solution contains a propylene glycol alginate as the sole polymeric constituent.

3. A method as claimed in claim 1 wherein from 3% to 15% by weight of sodium carbonate based on the weight of propylene glycol alginate in solution is used to bring the aqueous solution to an alkaline condition.

4. A method as claimed in claim 1 wherein the treated solution is reacidified to a pH of from 2 to 6.

5. A method as claimed in claim 1 when carried out at a temperature of from 5° C. to 25° C.

References Cited

UNITED STATES PATENTS

| 2,494,911 | 1/1950 | Steiner | 260—209.6 |
| 2,494,912 | 1/1950 | Steiner | 260—209.6 |
| 2,559,612 | 8/1951 | Geller | 260—209.6 |

JULIUS FROME, Primary Examiner

T. MORRIS, Assistant Examiner

U.S. Cl. X.R.

260—209.6